United States Patent
Oh et al.

(10) Patent No.: US 9,609,353 B2
(45) Date of Patent: *Mar. 28, 2017

(54) APPARATUS FOR ENCODING A MOVING PICTURE

(71) Applicant: M&K HOLDINGS INC., Seoul (KR)

(72) Inventors: Soo Mi Oh, Gyeonggi-do (KR); Moonock Yang, Singapore (SG)

(73) Assignee: M&K HOLDINGS INC., Seoul (KR)

(\*) Notice: Subject to any disclaimer, the term of this patent is extended or adjusted under 35 U.S.C. 154(b) by 0 days.

This patent is subject to a terminal disclaimer.

(21) Appl. No.: 15/259,535

(22) Filed: Sep. 8, 2016

(65) Prior Publication Data

US 2016/0381380 A1  Dec. 29, 2016

Related U.S. Application Data

(63) Continuation of application No. 15/062,357, filed on Mar. 7, 2016, which is a continuation of application
(Continued)

(30) Foreign Application Priority Data

Dec. 14, 2010 (KR) .................. 10-2010-0127633
Jun. 30, 2011 (KR) .................. 10-2011-0064312

(51) Int. Cl.
*H04N 19/52* (2014.01)
*H04N 19/159* (2014.01)
(Continued)

(52) U.S. Cl.
CPC .......... *H04N 19/52* (2014.11); *H04N 19/105* (2014.11); *H04N 19/107* (2014.11);
(Continued)

(58) Field of Classification Search
CPC ................................... H04N 19/52
See application file for complete search history.

(56) References Cited

U.S. PATENT DOCUMENTS

2003/0156648 A1\* 8/2003 Holcomb ............. H04N 19/136
375/240.18
2012/0189062 A1\* 7/2012 Sugio .................. H04N 19/176
375/240.16
(Continued)

FOREIGN PATENT DOCUMENTS

CN  1665301  9/2005
JP  2006-54846  2/2006
(Continued)

OTHER PUBLICATIONS

Wiegand et al., "Overview of the H.264/AVC Video Coding Standard", IEEE Transactions on Circuits and Systems for Video Technology, vol. 13, No. 7, Jul. 2003.
(Continued)

*Primary Examiner* — James Pontius
(74) *Attorney, Agent, or Firm* — Mintz Levin Cohn Ferris Glovsky and Popeo, P.C.; Kongsik Kim; Jonathon Western

(57) ABSTRACT

Provided is an apparatus for encoding a moving picture. When the current block is coded in intra prediction and a size of the transform block is larger than 4×4, the quantized transform coefficients of the quantized transform block are divided into a plurality of sub-blocks. The plurality of sub-blocks are scanned according to a first scan pattern determined by the intra prediction mode of the current block and the quantized transform coefficients of each sub-block are scanned according to a second scan pattern determined by the intra prediction mode of the current block. The first scan pattern for scanning the plurality of sub-blocks is the
(Continued)

same as the second scan pattern for scanning the quantized transform coefficients of each sub-block.

2 Claims, 5 Drawing Sheets

Related U.S. Application Data

No. 14/812,157, filed on Jul. 29, 2015, now Pat. No. 9,432,689, which is a continuation of application No. 13/624,814, filed on Sep. 21, 2012, now Pat. No. 9,113,163, which is a continuation of application No. PCT/KR2011/009562, filed on Dec. 13, 2011.

(51) Int. Cl.
| | |
|---|---|
| *H04N 19/61* | (2014.01) |
| *H04N 19/124* | (2014.01) |
| *H04N 19/91* | (2014.01) |
| *H04N 19/105* | (2014.01) |
| *H04N 19/107* | (2014.01) |
| *H04N 19/129* | (2014.01) |
| *H04N 19/176* | (2014.01) |
| *H04N 19/182* | (2014.01) |
| *H04N 19/172* | (2014.01) |

(52) U.S. Cl.
CPC ......... *H04N 19/124* (2014.11); *H04N 19/129* (2014.11); *H04N 19/159* (2014.11); *H04N 19/61* (2014.11); *H04N 19/91* (2014.11); *H04N 19/172* (2014.11); *H04N 19/176* (2014.11); *H04N 19/182* (2014.11)

(56) References Cited

U.S. PATENT DOCUMENTS

| | | | | |
|---|---|---|---|---|
| 2012/0236941 | A1* | 9/2012 | Lin | H04N 19/52 375/240.16 |
| 2013/0229485 | A1* | 9/2013 | Rusanovskyy | H04N 13/0048 348/43 |
| 2014/0161186 | A1* | 6/2014 | Zhang | H04N 19/597 375/240.16 |
| 2015/0245059 | A1* | 8/2015 | Terada | H04N 19/105 375/240.16 |
| 2015/0249828 | A1* | 9/2015 | Rosewarne | H04N 19/119 375/240.02 |

FOREIGN PATENT DOCUMENTS

| | | |
|---|---|---|
| JP | 2007-124564 | 5/2007 |
| JP | 2007-300389 | 11/2007 |
| JP | 2009-27541 | 2/2009 |
| JP | 2013-524707 | 6/2013 |
| KR | 10-2004-0007139 | 1/2004 |
| KR | 10-0570488 | 4/2006 |
| KR | 100728031 | 6/2007 |
| KR | 10-0798446 | 1/2008 |
| KR | 100871588 | 11/2008 |
| KR | 1020080114375 | 12/2008 |
| KR | 10-2010-0037180 | 4/2010 |
| WO | WO-2007/046644 | 4/2007 |

OTHER PUBLICATIONS

Fan et al., "A Novel Coefficient Scanning Scheme for Directional Spatial Prediction-Based Image Compression", ICME 2003.
Winken et al., "Description of video coding technology proposal by Fraunhofer HHI", JCT-VC (Joint Collaborative Team on Video Coding of ITU-T SG16 WP3 and ISO/IEC JTC1/SC29/WG11) 1. Dresden, Germany, Apr. 15-23, 2010, No. JCTVC-A116.
Ugur et al., "Description of video coding technology proposal by Tandberg, Nokia, Ericsson" JCT-VC (Joint Collaborative Team on Video Coding of ITU-T SG16 WP3 and ISO/IEC JTC1/SC29/WG11) 1. Dresden, Germany, Apr. 15-23, 2010, No. JCTVC-A119.
Karczewicz et al., "Video coding technology proposal by Qualcomm Inc.", JCT-VC (Joint Collaborative Team on Video Coding of ITU-T SG16 WP3 and ISO/IEC JTC1/SC29/WG11) 1. Dresden, Germany, Apr. 15-23, 2010, No. JCTVC-A121.
Seregin et al., "Low-complexity adaptive coefficients scanning", JCT-VC (Joint Collaborative Team on Video Coding of ITU-T SG16 WP3 and ISO/IEC JTC1/SC29/WG11) 3. Guangzhou, China, Oct. 7-15, 2010, No. JCTVC-C205.
Davies, "Unified scan processing for high efficiency coefficient coding", JCT-VC (Joint Collaborative Team on Video Coding of ITU-T SG16 WP3 and ISO/IEC JTC1/SC29/WG11) 4. Daegu, Korea, Jan. 20-28, 2011, No. JCTVC-D219.
Auyeung et al., "Parallel processing friendly simplified context selection of significance map", JCT-VC (Joint Collaborative Team on Video Coding of ITU-T SG16 WP3 and ISO/IEC JTC1/SC29/WG11) 4. Daegu, Korea, Jan. 20-28, 2011, No. JCTVC-D260.
Seregin et al., "CE11: Low-complexity adaptive coefficients scanning", JCT-VC (Joint Collaborative Team on Video Coding of ITU-T SG16 WP3 and ISO/IEC JTC1/SC29/WG11) 4. Daegu, Korea, Jan. 20-28, 2011, No. JCTVC-D360.
Zheng et al., "CE11: Mode Dependent Coefficient Scanning", JCT-VC (Joint Collaborative Team on Video coding of ITU-T SG16 WP3 and ISO/IEC JTC1/SC29/WG11), 4. Daegu, Republic of Korea, Jan. 20-28, 2011, No. JCTVC-D393.
Wiegand et al., "WD3: Working Draft 3 of High-Efficiency Video Coding", JCT-VC (Joint Collaborative Team on Video Coding of ITU-T SG16 WP3 and ISO/IEC JTC1/SC29/WG11) 5.Geneva, Switzerland, Mar. 16-23, 2011, No. JCTVC-E603, Part 1.
Wiegand et al., "WD3: Working Draft 3 of High-Efficiency Video Coding", JCT-VC (Joint Collaborative Team on Video Coding of ITU-T SG16 WP3 and ISO/IEC JTC1/SC29/WG11) 5. Geneva, Switzerland, Mar. 16-23, 2011, No. JCTVC-E603, Part 2.
Wiegand et al., "WD3: Working Draft 3 of High-Efficiency Video Coding", JCT-VC (Joint Collaborative Team on Video Coding of ITU-T SG16 WP3 and ISO/IEC JTC1/SC29/WG11) 5. Geneva, Switzerland, Mach 16-23, 2011, No. JCTVC-E603. Part 3.
Nguyen, "Description of Core Experiment (CE11): Coefficient scanning and coding", JCT-VC (Joint Collaborative Team on Video Coding of ITU-T SG16 WP3 and ISO/IEC JTC1/SC29/WG11) 5. Geneva, Switzerland, Mar. 16-23, 2011, No. JCTVC-E711.
International Telecommunication Union, ITU-T H.264, Telecommunication Standardization Sector of ITU, Series H: Audiovisual and Multimedia Systems—Infrastructure of audiovisual services—Coding of moving video, "Advanced video coding for generic audiovisual services", Mar. 2005.
Choi et al., "Adaptive Coefficient Scanning Based on the Intra Prediction Mode", ETRI Journal, vol. 29, No. 5, Oct. 2007.

* cited by examiner

APPARATUS FOR ENCODING A MOVING PICTURE

CROSS-REFERENCE TO RELATED APPLICATIONS

This application is a continuation application of U.S. application Ser. No. 15/062,357 filed on Mar. 7, 2016, which is a continuation application of U.S. application Ser. No. 14/812,157 filed on Jul. 29, 2015, which is a continuation application of U.S. application Ser. No. 13/624,814 filed on Sep. 21, 2012, which is a continuation application of International Application No. PCT/KR2011/009562 filed on Dec. 13, 2011, which claims priority to Korean Application No. 10-2010-0127663 filed on Dec. 14, 2010 and Korean Application No. 10-2011-0064312 filed Jun. 30, 2011. The applications are incorporated herein by reference.

TECHNICAL FIELD

The present invention relates to an apparatus for encoding a moving picture, and more particularly, to an apparatus for constructing a motion vector list by using a candidate of a spatial motion vector and a candidate of a temporal motion vector and encoding a motion vector of a current block using the motion vector candidate.

BACKGROUND ART

In image compression methods such as Motion Picture Experts Group (MPEG)-1, MPEG-2, MPEG-4 and H.264/MPEG-4 Advanced Video Coding (AVC), one picture is divided into macroblocks to encode an image. And, the respective macroblocks are encoded using inter prediction or intra prediction. Then, an optimal coding mode is selected in the bases of a data size of a macroblock to be encoded and distortion of an original macroblock, and the macroblock is encoded.

In the inter prediction, a motion estimation is used to eliminate temporal redundancy between consecutive pictures. The motion estimation coding is a method which encodes an image by estimating and compensating a motion of the current picture in the unit of block using one or more reference pictures.

In the motion estimation coding, the block most similar to the current block is searched within a predetermined search range for a reference picture using a predetermined estimation function. If the most similar block is searched, only residue between the current block and the most similar block in the reference picture is transmitted to raise a data compression ratio.

At this time, to decode the motion estimation coded current block, information for the motion vector indicating a position difference between the current block and the similar block in the reference picture. Therefore, it is required to insert encoded information for the motion vector into a bitstream when the current block is encoded. In this process, if the information for the motion vector is encoded and inserted as it is, a compression ratio of an image data is decreased because overhead is increased.

Therefore, in the inter prediction encoding, a motion vector of the current block is predicted using blocks adjacent to the current block, only a difference value between the generated motion vector predictor and the original motion vector is encoded and transmitted, and the information of the motion vector is also compressed.

In H.264, the motion vector predictor, which is a predictor of a motion vector of the current block, is determined as a median of mvA, mvB and mvC. As neighboring blocks are inclined to be similar each other, the motion vector of the current block is determined as a median of the motion vectors of the neighboring blocks.

But, if one or more motion vectors of the neighboring blocks are different from the motion of the current block, the median of the motion vectors of the neighboring blocks may be not an effective motion vector predictor for the current block. Also, a method of selecting a candidate for predicting a motion vector and of encoding or decoding the motion vector more effectively compared to the known motion prediction method is required when the motion of image is little or steady.

SUMMARY OF THE DISCLOSURE

The present invention is directed to provide an apparatus for encoding a motion vector of a current block using one of motion vectors of a prediction unit adjacent to a current prediction unit and motion vectors located at a predetermined position in a different picture timely.

One aspect of the present invention provides an apparatus for encoding a moving picture, comprising: a picture division unit configured to determine a size and a prediction mode of each coding block; an inter prediction unit configured to determine a reference picture and a motion vector of a current block by performing motion estimation and extract a prediction block corresponding to the current block from the reference picture based on the motion vector when the current block is coded in inter prediction mode; an intra prediction unit configured to determine an intra prediction mode of a current block and generate the prediction block corresponding to the current block according to the intra prediction mode when the current block is coded in intra prediction mode; a transform unit configured to transform a residual block obtained by calculating difference between the current block and the prediction block to generate a transform block; a quantization unit configured to determine a quantization step size and quantize the transform block using the quantization step size to generate a quantized transform block; a scanning unit configured to scan quantized transform coefficients of the quantized transform block to generate one-dimensional (1D) quantized transform coefficients; and an entropy coding unit configured to entropy-code the 1D quantized transform coefficients, wherein the inter prediction unit determines an available motion vector out of motion vectors of neighboring blocks adjacent to the current block as a spatial motion vector candidate, determines an available motion vector of a block located at a position corresponding to the current block in a temporal motion vector candidate picture as a temporal motion vector candidate, determines a motion vector predictor of the current block out of the spatial motion vector candidate and the temporal motion vector candidate, and encodes a difference between the motion vector of the current block and the motion vector predictor of the current block, wherein the temporal motion vector candidate is a motion vector of a first available block out of two blocks which exist in the temporal motion vector candidate picture, wherein the two blocks are a first candidate block and a second candidate block, the first candidate block is a below right corner block neighbored to a corresponding block which is co-located with the current block in the temporal motion vector candidate picture or a below right block within the corresponding block, and the second candidate block is a first center block which includes an upper left neighboring pixel with respect to a center position of the corresponding block or a second center block which includes a below right neighboring pixel with respect to the center position of the corresponding block, wherein, a size of the transform block is larger than 4×4, the quantized transform coefficients of the quantized transform block are divided into a plurality of sub-blocks, wherein, when the current block is coded in intra prediction, the plurality of sub-blocks are scanned according to a first scan pattern determined by the intra prediction mode of the current block and the quantized transform coefficients of each sub-block are scanned according to a second scan pattern determined by the intra prediction mode of the current block, and wherein the first scan pattern for scanning the plurality of sub-blocks is the same as the second scan pattern for scanning the quantized transform coefficients of each sub-block, wherein, when the current block is coded in inter prediction, the inverse scanning unit restores a plurality of sub-blocks by applying a predetermined scan pattern on the quantization coefficient sequence, and restores the quantized block by applying the predetermined scan pattern on the plurality of sub-blocks, wherein, when the prediction block is encoded in merge mode, the inter prediction unit determines an available motion vector out of motion vectors of neighboring blocks adjacent to the current block as a spatial merge candidate, determines an available motion vector of a block located at a position corresponding to the current block in a temporal merge candidate picture as a temporal merge candidate, determines a motion vector predictor of the current block out of the spatial merge candidate and the temporal merge candidate, and encodes a difference between the motion vector of the current block and the motion vector predictor of the current block, and wherein the temporal merge candidate includes a reference picture index and a motion vector, and the reference picture index of the temporal merge candidate is set to 0.

Preferably, the scanning unit scans the quantized transform coefficients and the plurality of sub-blocks in a reverse direction.

An apparatus according to the present invention accurately encodes the motion information of the current block using available spatial motion vector candidates of prediction blocks located at predetermined positions adjacent to the current block and one of temporal motion vector candidates of a prediction block located at a position corresponding to the current block in a reference picture encoded previously and located at a position adjacent to the position corresponding to the current block in the reference picture encoded previously. Therefore, computational complexity and bandwidth of the encoder is reduced and the motion information is rapidly and accurately encoded.

DETAILED DESCRIPTION OF THE DISCLOSURE

Figure 1:
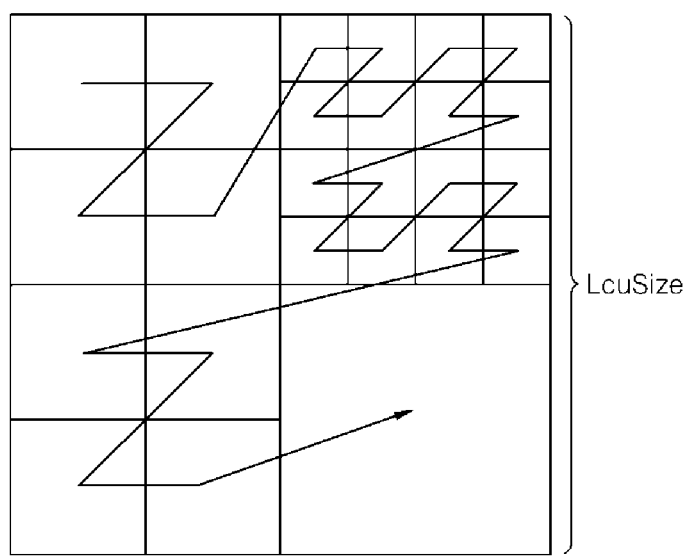
FIG. 1 is a conceptual diagram illustrating a method of scanning coding units in a largest coding unit according to the present invention.

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

A picture is divided into a plurality of slices, and each slice is divided into a plurality of largest coding units (LCUs). The position of each LCU is designated by an address indicator. The LCU may be a coding unit itself or may be divided into a plurality of coding units. The LCU contains information indicating structure of coding units in the LCU. One or more split flags are used to indicate the structure of coding units in the LCU.

Each coding unit (CU) consists of one or more prediction units. The prediction unit is a basic unit for intra prediction or inter prediction.

Each coding unit is composed of one or more prediction unit (PU). A transform unit (TU) is a basic block for transform coding. In intra prediction, the prediction unit contains one or more transform units. In inter prediction, a transform unit may be comprised of one or more prediction units. The maximum size of the prediction unit is defined in a sequence parameter set (SPS), and the transform unit may be divided into a form of a recursive quad tree. The maximum size of the prediction unit in intra prediction may be different from that of the prediction unit in inter prediction. The maximum sizes of the prediction unit in intra prediction and inter prediction are contained the SPS.

A prediction unit structure of a coding unit for luminance component is the same as that for chrominance components. But, a transform unit structure of a coding unit for luminance component may be different from that for chrominance components. That is, the transform unit size of the chrominance component may be determined regardless of the transform unit size of the luminance component. For example, the transform unit size of the chrominance component may be determined by the size of the coding unit. The transform unit size of the chrominance component may be adaptively adjusted by determining the maximum depth information of the chrominance component in advance. For example, if the depth information of the luminance component is equal to or smaller than the depth information of the chrominance component, the transform unit of the chrominance component is divided according to division information of the transform unit of the luminance component. On the contrary, if the depth information of the luminance component is larger than the depth information of the chrominance component, the transform unit of the chrominance component may be set not to have smaller size of the maximum depth information of the transform unit of the chrominance component. The maximum depth information of the transform unit of the chrominance component can be previously set or determined by the encoder and transmitted to the decoder.

A procedure of scanning coding unit for decoding is as follows. First, an address of a LCU is parsed from the bit stream. A LCU size is also parsed. The LCU size may be a predetermined value between an encoder and a decoder, or may be inserted into a sequence header or a picture header of a bit stream. A position of an upper left pixel of the LCU is obtained using the address and/or size of the LCU.

FIG. 1 is a conceptual diagram illustrating a method of scanning coding units in a largest coding unit according to the present invention. As shown in FIG. 1, the coding units in the LCU are scanned recursively in raster order.

If there are a plurality of prediction units in a coding unit, the prediction units are also scanned in raster order. The position of the prediction unit is specified by prediction unit index. Therefore the upper left pixel of the prediction unit is obtained using the prediction unit index.

If there are a plurality of transform units in a coding unit, the prediction units are also scanned recursively in raster order. The upper left pixel of the transform unit is obtained using the transform unit index.

Parameters transmitted by the encoder will be described. A sequence parameter set (SPS) is transmitted through sequence header. The sequence parameter set includes a smallest size of coding unit and maximum split depth information. The sequence parameter set also includes a smallest size of transform unit and maximum transform depth information. The transform depth information may be different in intra prediction and in inter prediction.

A slice header includes a slice type. If the slice type is P or B, information indicating a method used to generate a prediction block is included. The slice header may include a flag indicating whether a temporal candidate is used or not when encoding motion information. The temporal candidate is a motion vector of the prediction unit which exists at a position or nearby the position corresponding to the position of the current prediction unit. It is possible that a plurality of motion vectors exist at the position corresponding to the position of the current prediction unit or nearby or nearby the position corresponding to the position of the current prediction unit. In this case, one motion vector predetermined according to the position of the current prediction unit is selected as a temporal motion vector. The position of the candidate may be changed according to a position of the current prediction unit in LCU. The slice header may include a flag indicating whether a temporal candidate picture belongs to a reference picture list 0 or a reference picture list 1. If there is not the flag indicating a reference picture list, a value of the flag is considered 1 (that, the reference picture list 0).

The slice header includes information for managing memory to store reference pictures in case that the slice type is P or B.

The slice header includes a flag indicating whether adaptive loop filtering is applied to the current slice. If the adaptive loop filtering is applied, the slice header further includes adaptive loop filter (ALF) parameter information. The ALF parameter information includes information indicating a horizontal filter length and/or a vertical filter length of luminance components. The ALF parameter information may include information indicating the number of filters. If the number of filters is 2 or more, the coefficients of the filter may be encoded using prediction method. Furthermore, information whether prediction method is used may be included in the slice header.

Chrominance components may also be filtered adaptively. The ALF parameter information may include information whether each chrominance component is filtered or not. To reduce the amount of bits, the information indicating whether the Cr component is filtered and information indicating whether the Cb component is filtered may be coded jointly or multiplexed. An entropy coding is performed by assigning a lowest index in case that both of Cr and Cb components are not filtered, because the probability that both of Cr and Cb components are not filtered is high. And the information may include information indicating a horizontal filter length and/or a vertical filter length of chrominance components and filter information.

The ALF parameter may be transmitted in a picture header or another parameter set. In this case, the slice header does not include the ALF parameter and the ALF parameter may include index information indicating the ALF parameter.

The ALF process may be performed on the basis of coding unit or on the basis of coding unit equal to or larger than a predetermined size. And the slice header may include information indicating whether the adaptive loop filter process is applied to each coding unit. In this case, the information indicating the size of CU may be the predetermined size and may be included in the slice header.

A slice includes a slice header and a plurality of LCUs. The LCU includes information indicating the CU structure in the LCU. The CU structure is a recursive quad tree structure. The CU structure may include information (split_coding_unit_flag) which indicates whether a predetermined size of CU is split into smaller size of CUs. A coding unit of minimum size does not contain the split_coding_unit_flag. A coding unit may include information (alf_flag) indicating whether the ALF is applied or not. If the alf_flag is not included, it is considered that the ALF is not applied. Therefore, the decoder determines whether the alf_flag is included and applies the loop filter adaptively according to the value of the alf_flag, if the alf_flag is included.

In H.264, a median value of a horizontal component and a vertical component using motion vector of left neighboring block (A), an above neighboring block (B) and an above right neighboring block (C). But, in HEVC, because a prediction unit of adaptive size is used for motion compensation, there is a high possibility that the size of the current prediction unit is different from that of neighboring prediction unit. Therefore, the motion vector is predicted as follows.

A left motion vector which is located at and an above motion vector are used as spatial motion vector candidates. The left motion vector is a motion vector of one of a plurality of left neighboring prediction units and the above motion vector is a motion vector of one of a plurality of above neighboring prediction units. The neighboring prediction units may be located at predetermined positions. For example, the left motion vector is an available motion vector encountered first when retrieving the plurality of left neighboring prediction units in a first predetermined order, and the above motion vector is an available motion vector encountered first when retrieving the plurality of above neighboring prediction units in a second predetermined order. If a current prediction unit is located at the upper boundary of a picture or a slice, only the left motion vector is used as the spatial motion vector candidate. Also, if the current prediction unit is located at the left boundary of a picture or slice, only the above motion vector is used as the spatial motion vector candidate.

A motion vector of a predetermined block is used as a temporal motion vector candidate. The predetermined block exists at or nearby a position of a temporal candidate picture corresponding to a position of the current prediction unit. A plurality of blocks may exist at or nearby the position of a temporal reference picture candidate. Thus, the predetermined block may be a block determined by a position of the current prediction unit, or may be one of a plurality of blocks in a predetermined order. The predetermined block may be determined depending on a position of the current prediction unit in a LCU of the current prediction unit. In case that a slice including the current prediction unit is B slice, it is determined whether the temporal candidate picture containing the temporal motion vector candidate belongs to a reference picture list 0 or 1. A list indicator indicating one reference picture list is inserted in a slice header and transmitted to the decoder. If the slice header does not contain the list indicator, the list indicator is considered as 1 (that is, indicating reference picture list 0).

A procedure of encoding a motion vector of a current prediction unit is as follows.

First, a motion vector of the current prediction unit is obtained.

Next, an available left motion vector candidate and an available above motion vector candidate of the current prediction unit and neighboring the current prediction unit are derived. If the motion vector of neighboring prediction unit does not exist or the neighboring block of the current prediction unit exists outside of the boundary of the current slice, the motion vector of the neighboring block is determined as unavailable.

Next, the spatial motion vector candidate may be scaled adaptively. If the current prediction unit and the neighboring prediction unit have same reference picture, the motion vector candidate is not scaled. But, if the current prediction unit and the neighboring prediction unit have different reference pictures and the temporal distances of the reference pictures are not same, the motion vector candidate may be scaled using the temporal distances. The motion vector may not be scaled for a still image or background image. In this case, information (flag) indicating whether scaling is applied or not may be transmitted to the decoder. The number of scaling of the spatial motion vector candidate may be limited to a predetermined number. For example, the number of scaling may be 1. In this case, if scaling is performed once, the second spatial motion vector candidate to be scaled is set as unavailable.

Next, an available temporal motion vector candidate is derived. The available temporal motion vector candidate is the same as mentioned above.

Next, a candidate list is constructed using the available spatial and temporal motion vector candidates. The available temporal motion vector candidate is listed after the available spatial motion vector candidate. If a plurality of motion vector candidates are same, motion vector candidate of lower priority is deleted from the candidate list.

Next, a motion vector predictor of the current prediction unit is selected among the available spatial and temporal motion vector candidates. The number of motion vector candidate of the current prediction unit may be predetermined. If the number of available motion vector candidates is larger than the predetermined number, the motion vector predictor of the current prediction unit is selected among the predetermined number of motion vector candidates. If the number of available motion vector candidates is smaller than the predetermined number, one or more additional motion vector candidates may be added. The additional motion vector candidate may be a zero vector.

Next, a motion vector difference is obtained and encoded. Information indicating motion vector predictor is also encoded. The motion vector difference is a difference between the motion vector of the current prediction unit and the motion vector predictor of the current prediction unit.

A procedure of decoding a motion vector of a current prediction unit is as follows.

A motion vector difference of the current prediction unit is decoded.

Information indicating a motion vector predictor of the current prediction unit is restored.

Motion vector candidates for obtaining the motion vector predictor of the current prediction unit are determined through the following procedure.

First, an available left motion vector candidate and an available above motion vector candidate of the neighboring prediction unit of the current prediction unit are derived. If the motion vector of the neighboring prediction unit does not exist or the neighboring block of the current prediction unit exists outside of the boundary of the current slice, the motion vector of the neighboring block is determined as unavailable.

Next, the spatial motion vector candidate may be scaled adaptively. If the current prediction unit and the neighboring prediction unit have same reference picture, the motion vector candidate is not scaled. But, if the current prediction unit and the neighboring prediction unit have different reference pictures or the temporal distances of the reference pictures are not same, the motion vector candidate may be scaled using the temporal distances. The motion vector may not be scaled for a still image or background image. The number of scaling of the spatial motion vector candidate may be limited to a predetermined number. For example, the number of scaling may be 1. In this case, if scaling is performed once, the second spatial motion vector candidate to be scaled is set as unavailable.

Next, an available temporal motion vector candidate is derived. The available temporal motion vector candidate is the same as mentioned above.

Next, a candidate list is constructed using the available spatial motion vector candidate and the available temporal motion vector candidate. The available temporal motion vector candidate is listed after the available spatial motion vector candidate. If a plurality of motion vector candidates are same, motion vector candidate of lower priority is deleted from the candidate list.

Next, a motion vector predictor is selected among the available spatial motion vector candidate and the available temporal motion vector candidate. The number of motion vector candidate may be predetermined. If the number of available motion vector candidates is larger than the predetermined number, the motion vector predictor is selected among the predetermined number of motion vector candidates. If the number of available motion vector candidates is smaller than the predetermined number, one or more additional motion vector candidates may be added. The additional motion vector candidate is a zero vector.

When the motion vector candidates of the current prediction unit are derived, one motion vector candidate corresponding to information indicating the motion vector predictor of the current prediction unit is determined as the motion vector predictor of the current prediction unit.

A motion vector of the current prediction unit is obtained using the motion vector difference and the motion vector predictor.

A reference picture index of the temporal candidate picture may be 0.

Figure 2:
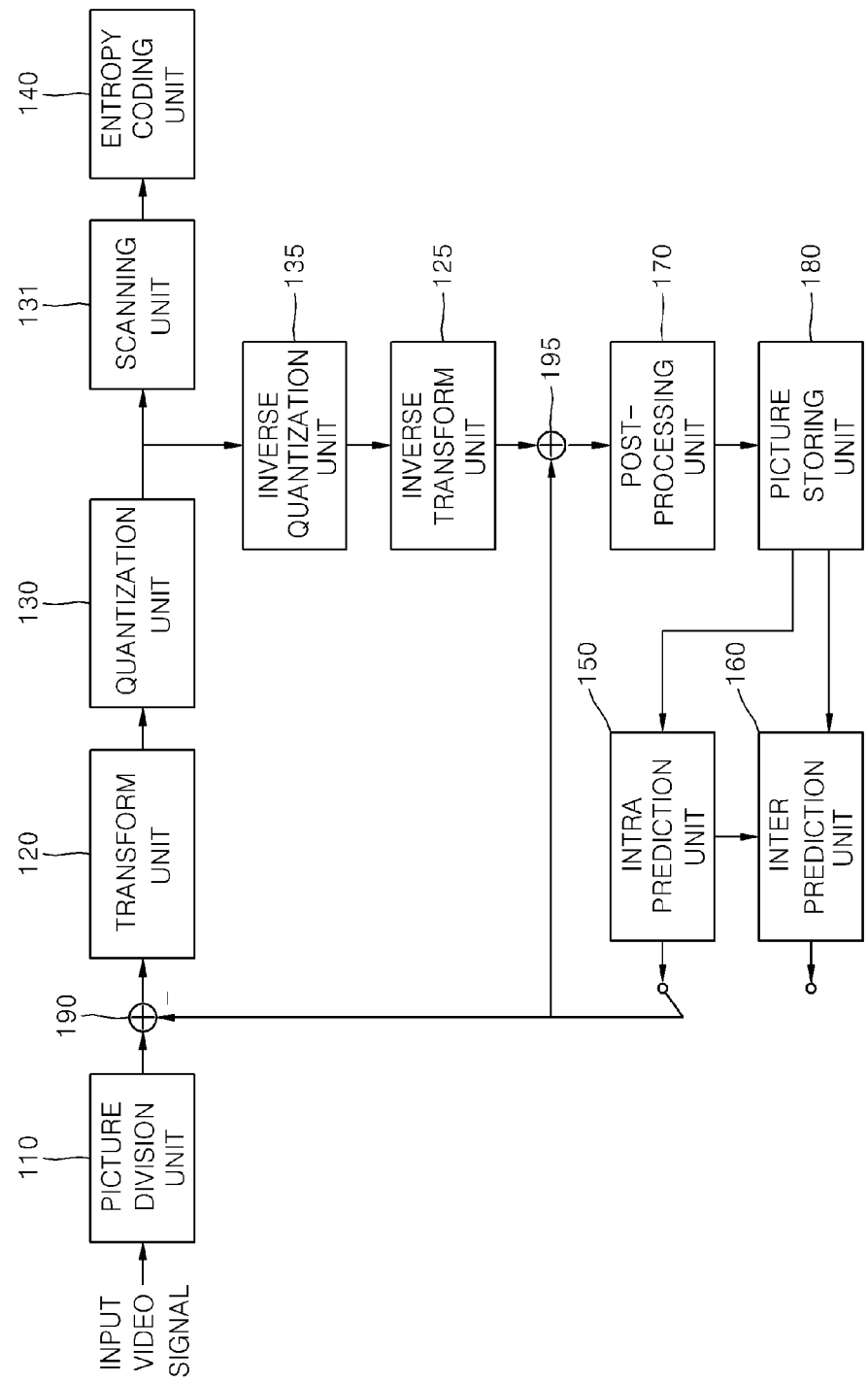
FIG. 2 is a block diagram of a moving picture coding apparatus according to the present invention.

FIG. 2 is a block diagram of a moving picture coding apparatus 100 according to the present invention.

Referring to FIG. 2, a moving picture coding apparatus 100 according to the present invention includes a picture division unit 110 (alternatively referred to herein as a "picture divider"), a transform unit 120 (alternatively referred to herein as a "transformer"), a quantization unit 130 (alternatively referred to herein as a "quantizer"), a scanning unit 131 (alternatively referred to herein as a "scanner"), an entropy coding unit 140 (alternatively referred to herein as an "entropy coder"), an intra prediction unit 150 (alternatively referred to herein as an "intra predictor"), an inter prediction unit 160 (alternatively referred to herein as an "inter predictor"), an inverse quantization unit 135, an inverse transform unit 125, a post-processing unit 170, a picture storing unit 180, a subtracter 190 and an adder 195.

The picture division unit 110 divides analyzes an input video signal to divide each LCU of a picture into one or more coding units each of which has a predetermined size, determine prediction mode of each coding unit, and determines size of prediction unit per each coding unit. The picture division unit 110 sends the prediction unit to be encoded to the intra prediction unit 150 or the inter prediction unit 160 according to the prediction mode. Also, the picture division unit 110 sends the prediction units to be encoded to the subtracter 190.

The transform unit 120 transforms residual blocks which are residual signals between an original block of a prediction unit and a prediction block generated by the intra prediction unit 150 or the inter prediction unit 160. A size of a transform unit of the residual block is equal to or smaller than a size of coding unit. In intra prediction, the size of the transform unit is equal to or smaller than the size of the prediction unit. In inter prediction, the size of the transform unit is also equal to or smaller than the size of the prediction unit, although the size of the transform unit may be larger than the size of the prediction unit. A transform matrix may be adaptively determined according to a prediction mode (intra or inter) and an intra prediction mode. The transform unit may be transformed by horizontal and vertical one-dimensional (1D) transform matrices.

In inter prediction, one predetermined transform matrix per each transform direction is applied.

If the prediction mode is intra prediction of luminance component and the size of the transform unit is equal to or smaller than a predetermined size, the vertical and horizontal 1D transform matrices are adaptively determined. For example, if the intra prediction mode is horizontal, there is a high possibility that the residual block will have vertical directivity. Thus, a discrete cosine transform (DCT)-based integer matrix is applied to the vertical direction and a discrete sine transform (DST) or Karhunen Loeve transform (KLT)-based integer matrix is applied to the horizontal direction. If the intra prediction mode is vertical, a DST or KLT-based integer matrix is applied to the vertical direction and a DCT-based integer matrix is applied to the horizontal direction. Also, in DC mode, a DCT-based integer matrix is applied to the horizontal and vertical directions. That is, in intra prediction of luminance component, the transform matrix may be adaptively determined according to a size of the transform unit and the intra prediction mode. Meanwhile, in intra prediction mode of chrominance component, the transform matrix is a predetermined matrix regardless of the prediction mode and the intra prediction mode.

Meanwhile, a transform pattern may adaptively be selected per transform unit among a plurality of transform patterns, and the selected transform pattern may be transmitted to a decoder. The plurality of transform patterns may include a two-dimensional transform, a vertical transform and a horizontal transform. A scan pattern of the scanning unit 131 may be determined by the transform pattern. For example, a first scan pattern (diagonal scan) is selected if the transform pattern is the two-dimensional transform, a second scan pattern (horizontal scan) is selected if the transform pattern is the vertical transform, a third scan pattern (vertical scan) is selected if the transform pattern is the horizontal transform, and the first scan pattern is selected if the transform pattern is the pattern where no transform is applied. The quantization unit 130 determines a quantization step size for quantizing transform coefficients of the residual block transformed by the transform matrix.

The quantization step size is determined on a coding unit having a size equal to or larger than a predetermined size. For coding unit having a size smaller than the predetermined size, the quantization step size is determined on the predetermined size. Using the determined quantization step size and a quantization matrix determined according to a prediction mode, the transform coefficients of the transform block are quantized. When the size of the current coding unit is equal to or larger than the predetermined size, the quantization unit 130 may determine a quantization step size predictor of the current coding unit using quantization step sizes of neighboring coding units or a quantization step size of a previous coding unit in scan order.

For example, the quantization unit 130 may determine a quantization step size of a left coding unit, a quantization step size of a above coding unit or average of the quantization step sizes of the left and above coding units as a quantization step size predictor according to an intra prediction mode of the current coding unit. If the above coding unit does not exist, the quantization step size of the left coding unit or the previous coding unit may be determined as the quantization step size predictor. If the left coding unit is unavailable, the quantization step size of the above coding unit or the previous coding unit may be determined as the quantization step size predictor. When the average of the quantization step sizes of the left and the above coding units is used, if only one quantization step size is available, the available one or the quantization step size of the previous coding unit may be determined as the quantization step size predictor. The above-mentioned method may be applied only to the coding unit within a LCU. That is, if the left or the above coding unit exists outside of the boundary of the LCU, the coding unit may be considered as a unavailable coding unit.

The quantized transform block is provided to the inverse quantization unit 135 and the scanning unit 131.

The scanning unit 131 scans the coefficients of the quantized transform block or information indicating whether the quantized transform coefficients exists or not and transforms the coefficients and the information into 1D coefficients. A scan pattern is determined according to the prediction mode and the intra prediction mode. The scan pattern may also be determined according to the size of the transform unit.

The scanning unit 131 determines whether or not to divide the quantized transform block into a plurality of subsets according to the size of the current transform unit. If the size of the transform unit is larger than a first reference size, the quantized transform block is divided into the plurality of subsets. The first reference size is 4×4 or 8×8.

The scanning unit 131 determines a scan pattern to be applied to the quantized transform block. In inter prediction, a predetermined scan pattern (for example, zigzag scan) is used. In intra prediction, the scan pattern is selected based on the intra prediction mode and may be varied according to a directional intra prediction mode. The first scan pattern is used for non-directional intra prediction modes. The non-directional intra prediction modes are a DC mode and a planar mode. The scan is performed in a forward direction or in a reverse direction. When the quantized coefficients are divided into a plurality of subsets, same scan pattern is applied to all the subsets. The plurality of subsets consist of one main subset and one or more residual subsets. The main subset is located at an upper left side and includes a DC coefficient. The one or more residual subsets cover region other than the main subset.

The first scan pattern may be applied to scan the subsets. The subsets may be scanned beginning with the main subset to the residual subsets in a forward direction, or can be scanned in a reverse direction. A scan pattern for scanning the subsets may be set the same as a scan pattern for scanning the quantized transform coefficients in the subsets. In this case, the scan pattern for scanning the subsets is determined according to intra prediction mode.

An encoder transmits information capable of indicating a position of the last non-zero quantized coefficient of the transform unit to a decoder. The encoder also transmits information capable of indicating a position of the last non-zero quantized coefficient of each subset to the decoder or information indicating whether each subset includes non-zero coefficient or not.

The inverse quantization unit 135 inversely quantizes the quantized transform coefficients. The inverse transform unit 125 restores residual blocks of the spatial domain from the inversely quantized transform coefficients. The adder generates a reconstructed block by adding the residual block reconstructed by the inverse transform unit 125 and the prediction block from the intra prediction unit 150 or the inter prediction unit 160.

The post-processing unit 170 performs a deblocking filtering process for removing blocking artifact generated in a reconstructed picture, an adaptive offset application process for complementing a difference between the reconstructed picture and the original image per pixel, and an adaptive loop filter process for complementing a difference between the reconstructed picture and the original image in a coding unit.

The deblocking filtering process may be applied to a boundary between prediction units having a predetermined size or more and a boundary between transform units. The predetermined size may be 8×8. The de-blocking filtering process includes a step of determining a boundary to be filtered, a step of determining boundary filtering strength to be applied to the boundary, a step of determining whether or not to apply a deblocking filter, and a step of selecting a filter to be applied to the boundary when it is determined to apply the de-blocking filter.

Whether or not to apply the deblocking filter is determined according to i) whether or not the boundary filtering strength is greater than 0 and ii) whether or not a value indicating the difference between boundary pixels of P block and Q block is smaller than a first reference value determined according to a quantization parameter.

Two or more filters may exist. When an absolute value of a difference between two pixels adjacent to the block boundary is equal to or larger than a second reference value, a weak filter is selected. The second reference value is determined by the quantization parameter and the boundary filtering strength.

The adaptive loop filter process may be performed on the basis of a value obtained by comparing an original image and a reconstructed image to which the de-blocking filtering process or the adaptive offset application process is applied. An adaptive loop filter (ALF) is detected through one Laplacian activity value on the basis of a 4×4 block. The determined ALF can be applied to all pixels included in a 4×4 block or an 8×8 block. Whether or not to apply an ALF may be determined according to coding units. A size and coefficients of a loop filter may vary according to each coding unit. A slice header may include information indicating whether or not to apply the ALF to each coding unit, filter coefficient information and filter shape information, and so on. In the case of chrominance components, whether or not to apply the ALF may be determined in picture units. Unlike luminance, the loop filter may have a rectangular shape.

The picture storing unit 180 receives post-processed image data from the post-processing unit 160, and stores the image in picture units. A picture may be an image in a frame or a field. The picture storing unit 180 has a buffer (not shown) capable of storing a plurality of pictures.

The inter prediction unit 150 performs motion estimation using one or more reference pictures stored in the picture storing unit 180, and determines reference picture indexes indicating the reference pictures and motion vectors. According to the reference picture index and the motion vector, the inter prediction unit 150 extracts a prediction block corresponding to a prediction unit to be encoded from a reference picture selected among a plurality of reference pictures stored in the picture storing unit 150 and outputs the extracted prediction block.

The intra prediction unit 140 performs intra prediction using reconstructed pixel values within a current picture. The intra prediction unit 140 receives the current prediction unit to be predictively encoded, selects one of a predetermined number of intra prediction modes, and performs intra prediction. The predetermined number of intra prediction modes may depend on the size of the current prediction unit. The intra prediction unit adaptively filters the reference pixels to generate the intra prediction block. When some of reference pixels are not available, it is possible to generate the reference pixels at the unavailable positions using one or more available reference pixels.

The entropy coding unit 130 entropy-codes the quantized coefficients quantized by the quantization unit 130, intra prediction information received from the intra prediction unit 140, motion information received from the inter prediction unit 150, and so on.

Figure 3:
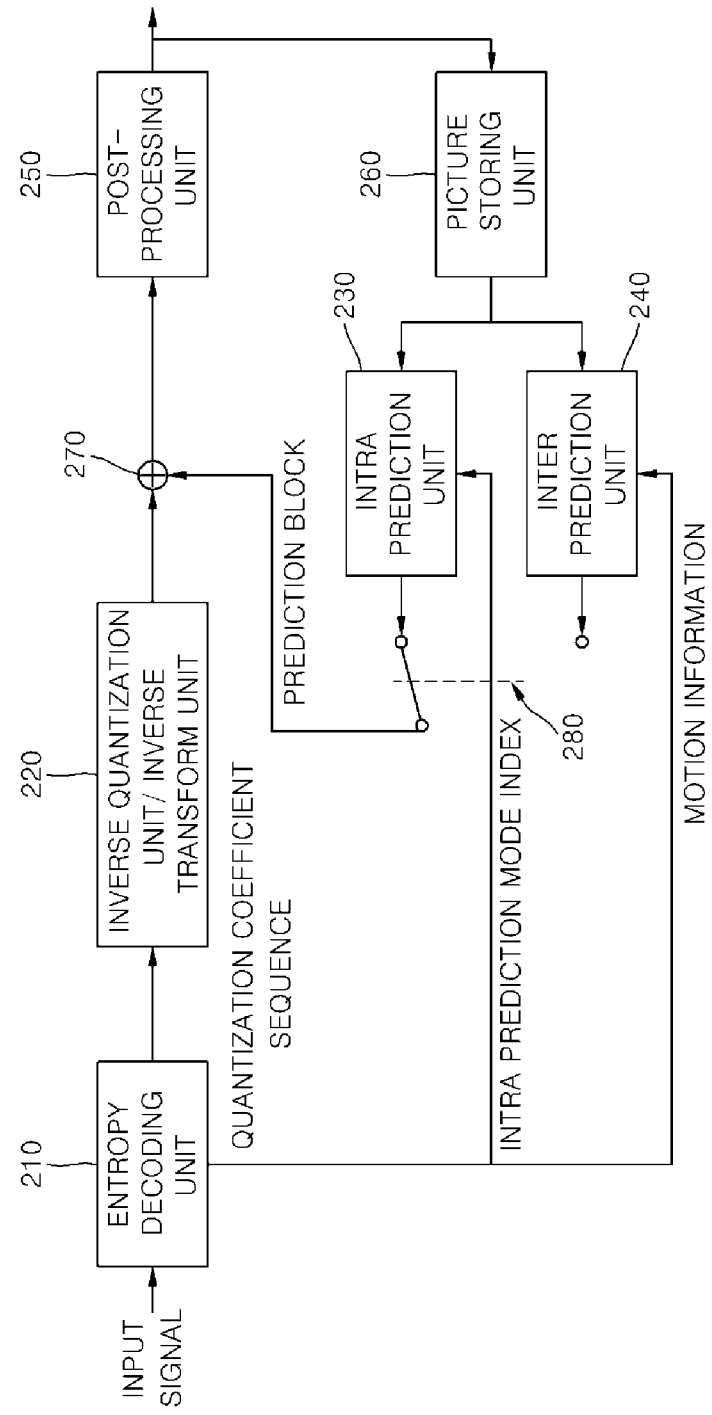
FIG. 3 is a block diagram of a moving picture decoding apparatus according to the present invention.

FIG. 3 is a block diagram of a moving picture decoding apparatus according to the present invention.

Referring to FIG. 3, the moving picture decoding apparatus according to the present invention includes an entropy decoding unit 210, an inverse quantization/transform unit 220, an adder 270, a post-processing unit 250, a picture storing unit 260, an intra prediction unit 230, an inter prediction unit 240 and a switch 280.

The entropy decoding unit 210 extracts intra prediction mode indexes, motion vectors, quantized coefficients sequences (residual block signal), and so on from a received bit stream transmitted from a moving picture coding apparatus. The entropy decoding unit 210 transmits the decoded motion information to the inter prediction unit 240, the intra prediction mode indexes to the intra prediction unit 230 and the inverse quantization/transform unit 220, and the quantized coefficients sequence to the inverse quantization/transform unit 220.

The inverse quantization/transform unit 220 includes an inverse scanning unit 221 (alternatively referred to herein as "inverse scanner"), an inverse quantization unit 222 (alternatively referred to herein as "inverse quantizer") and an inverse transform unit 223 (alternatively referred to herein as "inverse transformer").

The inverse scanning unit 221 converts the quantized coefficients sequence into two dimensional inverse quantized coefficients. One of a plurality of inverse scan patterns is selected for the conversion. The inverse scan pattern is selected based on at least one of the prediction mode (intra prediction mode or inter prediction mode) and the intra prediction mode of a current block.

For example, in inter prediction, a first scan pattern (for example, zigzag scan or diagonal scan) is used. In intra prediction, a second scan pattern is selected based on the intra prediction mode. The second scan pattern may be varied according to directional intra prediction modes. For non-directional intra prediction modes, the first scan pattern may be applied.

If the size of a current transform unit to be decoded is larger than a first predetermined reference size and the current transform unit is encoded in the unit of subsets, a quantized transform block is restored by inversely scanning each subset. In this case, same scan pattern is applied to all the subsets. The plurality of subsets consist of one main subset and one or more residual subsets. The main subset is located at an upper left side and includes a DC coefficient. The one or more residual subsets cover region other than the main subset.

The first scan pattern may be applied to inversely scan the subsets. The subsets may be scanned beginning with the main subset to the residual subsets in a forward direction, or can be scanned in a reverse direction. A scan pattern for scanning the subsets may be set the same as a scan pattern for scanning the quantized transform coefficients in the subsets. In this case, the scan pattern for inversely scanning the subsets is selected according to the intra prediction mode.

When the size of the transform unit is equal to or larger than a predetermined size, inverse scan may be performed by decoding information indicating whether each subset includes non-zero coefficients. That is, the quantized transform block can be restored by inversely scanning coefficients in the subsets including non-zero coefficients are inversely scanned using the information and by setting all the subsets including 0 as 0.

The inverse quantization unit 222 generates a quantization step size predictor of a current coding unit. The quantization step size is determined on a coding unit having a size equal to or larger than a predetermined size. If a plurality of coding units are included in the predetermined size, the quantization step size is determined on the predetermined size. The inverse quantization unit 222 may determine a quantization step size predictor using one or more quantization step sizes of neighboring coding unit or a quantization step size of the previous coding unit in scan order.

The inverse quantization unit 222 restores a quantization step size to inversely quantize the 2D inverse quantized coefficients. The quantization step size is determined on a coding unit having a size equal to or larger than a predetermined size. If the size of coding units is smaller than the predetermined size, the predetermined quantization step size which is determined per each coding unit in the unit of the predetermined size is determined as the quantization step size. The inverse quantization unit 222 may use quantization step sizes of one or more neighboring coding units of the current prediction unit or a quantization step size of the previous coding unit in scan order as a quantization step size predictor of the current coding unit.

For example, the inverse quantization unit 222 may adaptively select a quantization step size of a left coding unit, a quantization step size of an above coding unit, or a rounded up average of quantization step sized of the left and the above quantization step sizes as the quantization step size predictor of the current coding unit according to the intra prediction mode of the current coding unit.

If the above coding unit does not exist, the quantization step size of the left coding unit or the previous coding unit may be determined as the quantization step size predictor. If the left coding unit is unavailable, the quantization step size of the above coding unit or the previous coding unit may be determined as the quantization step size predictor. When the rounded up average of the quantization step sizes of the left and the above coding units is used, if only one quantization step size is available, the available one or the quantization step size of the previous coding unit may be determined as the quantization step size predictor. In inter prediction, the quantization step size predictor is the rounded up average of the quantization step sizes of the left and the above coding units or the quantization step size of the previous coding unit. Meanwhile, the above-mentioned method may be applied only to the coding unit within a LCU. That is, if the left or the above coding unit exists outside of the boundary of the LCU, the coding unit may be considered as a unavailable coding unit.

When the quantization step size predictor is determined, the quantization step size of the current coding unit is generated by adding a received residual quantization step size and the quantization step size predictor. Then, the quantized transform coefficients are inversely quantized using an inverse quantization matrix determined by the quantization step size and the prediction mode.

The inverse transform unit 223 determines an inverse transform matrix according to the size of the transform unit if the inverse quantized block is a luminance block and the prediction mode is intra. For example, if the size of the transform unit is equal to or smaller than a predetermined size, the vertical and the horizontal one-dimensional inverse transform matrixes are determined according to the intra prediction mode. For example, if the intra prediction mode is horizontal, there is a high possibility that the residual block will have vertical directivity. Thus, a DCT-based integer matrix is applied to the vertical direction, and a DST or KLT-based integer matrix is applied to the horizontal direction. If the intra prediction mode is vertical, a DST or KLT-based integer matrix is applied to the vertical direction, and a DCT-based integer matrix is applied to the horizontal direction. Also, in DC mode, a DCT-based integer matrix is applied to the horizontal and the vertical directions. That is, in intra prediction of luminance component, the inverse transform matrix may be adaptively determined according to the size of the transform unit and the intra prediction mode. Meanwhile, in intra prediction mode of chrominance component, the inverse transform matrix is a predetermined matrix regardless of the prediction mode (intra prediction mode or inter prediction mode) and the intra prediction mode.

The adder 270 adds the restored residual block restored by the inverse quantization/transform unit 220 and a prediction block generated by the intra prediction unit 230 or the inter prediction unit 240 to generate a reconstructed block.

The post-processing unit 250 performs a deblocking filtering process for removing blocking artifact generated in a reconstructed picture, an adaptive offset application process for complementing a difference between the reconstructed picture and the original image per pixel, and an adaptive loop filter process for complementing a difference between the reconstructed picture and the original image in a coding unit.

The deblocking filtering process may be applied to boundaries of prediction units and transform units having a predetermined size or more. The deblocking filtering process may be applied to block edge having the size of 8×8 in case that the horizontal length or the vertical length of the prediction unit or the transform unit is smaller than 8. The vertical edge is filtered first, and then the horizontal edge is filtered. The deblocking filtering process includes a step of determining a boundary to be filtered, a step of determining boundary filtering strength to be applied to the boundary, a step of determining whether or not to apply a deblocking filter, and a step of selecting a filter to be applied to the boundary when it is determined to apply the deblocking filter.

Whether or not to apply the deblocking filter is determined according to i) whether or not the boundary filtering strength is greater than 0 and ii) whether or not a value indicating the difference between boundary pixels of P block and Q block is smaller than a first reference value determined according to a quantization parameter.

Two or more filters may exist. When an absolute value of a difference between two pixels adjacent to the block boundary is equal to or larger than a second reference value, a weak filter is selected. The second reference value is determined by the quantization parameter and the boundary filtering strength.

The adaptive loop filter process may be performed on the basis of a value obtained by comparing an original image and a reconstructed image to which the de-blocking filtering process or the adaptive offset application process is applied. An adaptive loop filter (ALF) is detected through one Laplacian activity value on the basis of a 4×4 block. The determined ALF can be applied to all pixels included in a 4×4 block or an 8×8 block. Whether or not to apply an ALF may be determined according to coding units. A size and coefficients of a loop filter may vary according to each coding unit. A slice header may include information indicating whether or not to apply the ALF to each coding unit, filter coefficient information and filter shape information, and so on. In the case of chrominance components, whether or not to apply the ALF may be determined in picture units. Unlike luminance, the loop filter may have a rectangular shape.

The picture storing unit 260 is a frame memory storing a local reconstructed picture filtered by the post-processing unit 250.

The intra prediction unit 230 restores the intra prediction mode of the current block based on the received intra prediction mode index, and generates a prediction block according to the restored intra prediction mode.

The switch 280 provides a prediction unit generated by the intra prediction unit 230 or the inter prediction unit 240 to the adder 270 according to the prediction mode.

The inter prediction unit 240 restores motion information of the current prediction unit based on the received motion information, and generates a prediction block from the picture stored in the picture storing unit 260 based on the restored motion information. When motion compensation of decimal precision is applied, the inter prediction unit 240 generates the prediction block by applying a selected interpolation filter.

Now, a method of decoding a moving image in inter prediction mode is described. The method comprises a procedure of generating a prediction block of the current prediction unit, a procedure of restoring a residual block of the current prediction unit and a procedure of generating a reconstructed block using the prediction block and the residual block. The procedure of generating a prediction block is performed by the inter prediction unit 240 of FIG. 3.

The procedure of generating a prediction block of a current prediction unit is as follows. The procedure includes 1) a step for deriving motion information of a prediction unit and 2) a step for generating a prediction block of the prediction unit. The motion information includes motion vector, prediction direction and reference picture index.

When the prediction unit is encoded in skip mode, the procedure of generating a prediction block is as follows. If a skip_flag in a received coding unit is 1, the prediction unit is the coding unit.

Figure 4:
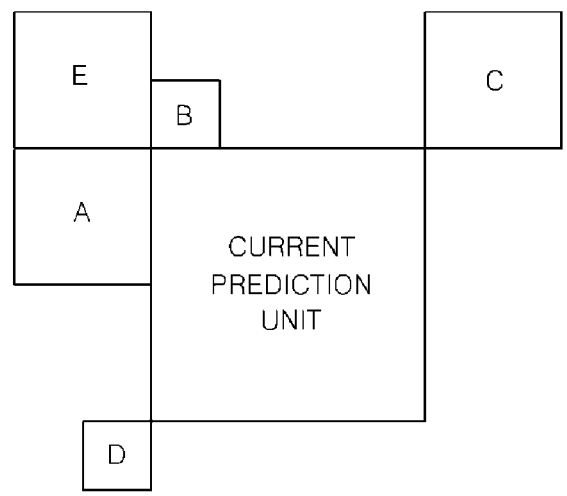
FIG. 4 is a conceptual diagram illustrating positions of spatial skip candidate blocks according to the present invention.

FIG. 4 is a conceptual diagram showing positions of spatial skip candidates according to the present invention. As shown in FIG. 4, a left prediction unit (block A), an above prediction unit (block B), an above right prediction unit (block C) and a left below prediction unit (block D) may be the spatial skip candidates. When a plurality of left prediction units exist, an uppermost left prediction unit or a lowest left prediction unit may be determined as the left prediction unit. When a plurality of above prediction units exist, a leftmost above prediction unit or a rightmost above prediction unit may be determined as the above prediction unit.

First, the availability of each spatial skip candidate (A, B, C, D) is checked. If the prediction unit does not exist or the prediction mode of the prediction unit is intra, the candidate block is determined as unavailable.

The above left prediction unit (block E) of the current prediction unit can be a spatial skip candidate if one or more than a predetermined number of the candidate blocks A, B, C and D are unavailable. The predetermined number may be decided according to the number of skip candidates transmitted from an encoder.

A temporal skip candidate is derived. The procedure of deriving the temporal skip candidate includes a step for deriving a reference picture index of the temporal skip candidate and a step for deriving a motion vector of the temporal skip candidate. The reference picture index of temporal skip candidate may be set to 0 or may be derived using reference picture indexes of spatially neighboring prediction units. The neighboring prediction units are predetermined.

The motion vector for the temporal skip candidate is derived as follows.

First, a picture (hereinafter, 'a temporal skip candidate picture') which a temporal skip candidate block belongs to is determined. A reference picture of index 0 may be determined as the temporal skip candidate picture. For example, a first reference picture of the reference picture list 0 is determined as the temporal skip candidate picture when the slice type is P. When the slice type is B, one reference picture list is selected using a flag of slice header indicating the temporal skip candidate picture and a first reference picture of the selected reference picture list is determined as the temporal skip candidate picture. For example, the temporal skip candidate picture is derived from the selected reference picture list 0 when the flag is 1, whereas, the temporal skip candidate picture is derived from the selected reference picture list 1 when the flag is 0.

Alternatively, a reference picture indicated by a reference picture index for temporal skip candidate is determined as the temporal skip candidate picture which the temporal skip candidate block belongs to.

Next, a temporal skip candidate block is derived. One of a plurality of blocks corresponding to the current prediction unit is selected as the temporal skip candidate block. The plurality of blocks are included in the temporal skip candidate picture. In this case, one of a plurality of blocks is selected based on a position of the current prediction unit or one of a plurality of blocks located at a predetermined position is selected. When one of a plurality of blocks is selected, a first available block determined based on the priorities assigned to the plurality of blocks is selected as the temporal skip candidate block. If the motion vectors of the blocks corresponding to the current prediction unit are not available, the temporal skip candidate is considered as unavailable.

Figure 5:
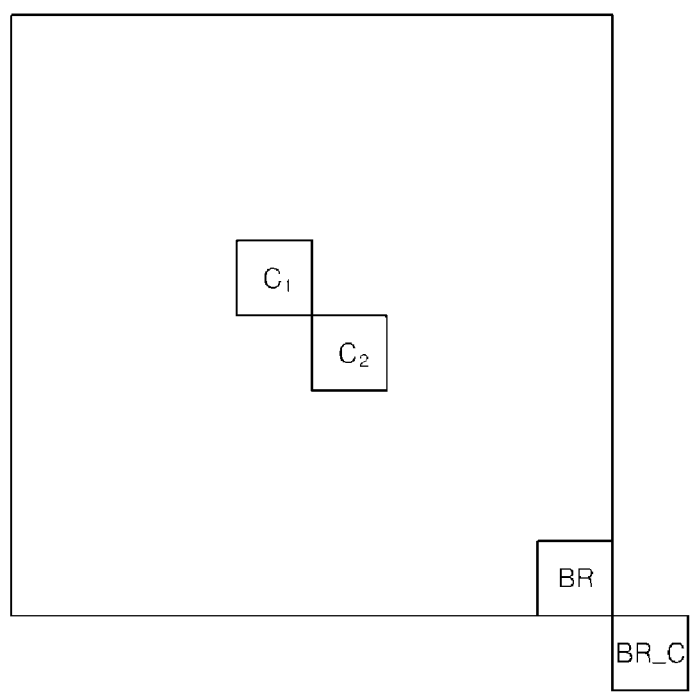
FIG. 5 is a conceptual diagram illustrating positions of blocks in a temporal skip candidate picture corresponding to a current prediction unit according to the present invention.

FIG. 5 is a conceptual diagram illustrating positions of blocks in a temporal skip candidate picture corresponding to a current prediction unit according to the present invention.

In a case of selecting one of the candidate blocks, a below right corner block (block BR_C) or a lower right block (block BR) may be a first skip candidate block. And a block (block C1) including an upper left pixel or a block (block C2) including an upper left pixel of the center position of a block which is included in the temporal skip candidate picture and corresponds to the current prediction unit may be a second skip candidate block. If the first candidate block is available, the first candidate block is determined as the temporal skip candidate block. If the first candidate block is not available and the second candidate block is available, the second candidate block is determined as the temporal skip candidate block.

When the current prediction unit is located at the lower boundary or right boundary of a picture, the second candidate block is determined as the temporal skip candidate block if the second skip candidate block is available. When the current prediction unit is located at the lower boundary of a slice or a LCU, the second candidate block is determined as the temporal skip candidate block if the second candidate block is available.

Next, a skip candidate list is generated.

The skip candidate list is generated using available spatial and temporal skip candidates. The skip candidates may be listed in a predetermined order. The predetermined order may be an order of a spatial left skip candidate (block A), a spatial above skip candidate (block B), a temporal skip candidate, a spatial above right skip candidate (block C) and a spatial below left skip candidate (block D).

The predetermined order may be changed according to the number of skip candidates transmitted from an encoder. In this case, the order of spatial skip candidates is not changed (that is, A, B, C, D, E, and available spatial skip candidates are allowed), but the priority of the temporal skip candidate may be changed.

For example, if the number of skip candidates is 5, the temporal skip candidate is listed after available spatial skip candidates. If the number of skip candidates is 3, the order of a temporal skip candidate may be adjusted so that the temporal candidate is listed in top 3. The skip candidates may be listed in an order of the spatial left skip candidate (block A), the spatial above skip candidate (block B) and the temporal skip candidate. If two or more available spatial skip candidates exist, the temporal skip candidate is listed after two of available spatial skip candidates. When the number of skip candidates is 2 or 4, the same method is applied.

Meanwhile, if the number of the available skip candidates in the skip candidate list is smaller than a received candidate number from the encoder, one or more skip candidate are generated. The generated skip candidate is listed after the last available skip candidate. When a plurality of skip candidates are generated, the candidates are added in a predetermined order.

The skip candidates are generated using a plurality of methods in a predetermined order. The method used to generate the skip candidate depends on the type of slice to which the current prediction unit belongs.

When a current slice type is B and the number of available skip candidates is two or more, a first method may be used. When the reference list of the first available skip candidate is different from the reference list of the second available skip candidate, the motion information of the first available skip candidate and the motion information of the first available skip candidate may be combined to generate one or more skip candidates. The generated skip candidate is bi-directional motion information. If a plurality of skip candidates are generated, the generated skip candidates are added according to a predetermined order. The predetermined order is determined based on indexes of the available skip candidates. The number of the skip candidates generated by the first method may be limited to a predetermined number.

In a second method, a skip candidate having zero motion vector is added. The skip candidate having zero motion vector is one of a uni-directional L0 skip candidate, a uni-directional L1 skip candidate and a bi-directional skip candidate. The uni-directional L0 skip candidate has zero motion vector, reference picture list 0 and reference picture index of 0. The uni-directional L1 skip candidate has zero motion vector, reference picture list 1 and reference picture index of 0. The bi-directional skip candidate is a combination of the uni-directional L0 skip candidate and the uni-directional L1 skip candidate.

When the current slice type is P, the uni-directional L0 skip candidate is added. When the current slice type is B, one or more skip candidates having zero motion vector may be added. For the slice type B, the bi-direction skip candidate may be added first or skip candidates having zero motion vector may be added in a predetermined order (for example, in an order of the bi-directional skip candidate and the uni-directional skip candidate) until the number of skip candidate is reached.

Next, the motion vector and the reference picture index of the current prediction unit are derived.

When there is a skip index in the received prediction unit, the motion vector and the reference picture index of the skip candidate indicated by the skip index are determined as the motion vector and the reference index of the current prediction unit. When there is not a skip index in the received prediction unit and there exists a skip candidate, the motion vector and the reference picture index of the skip candidate are determined as the motion vector and the reference index of the current prediction unit.

When the skip index indicates the temporal skip candidate, the motion vector of the temporal skip candidate is determined as the motion vector of the current prediction unit and the reference picture index for the temporal skip candidate is determined as the reference picture index of the current prediction unit.

If the motion vector and the reference picture index of the current prediction unit are derived, a prediction block is generated using motion vector in the picture indicated by the reference picture index. The prediction block is output as a reconstructed block of the current prediction unit.

Next, merge mode is described.

When the skip_flag in the coding unit is 0 and merge_flag in the received prediction unit is 1, a procedure of generating a prediction block is almost same as the procedure of generating a prediction block of the skip mode.

Available spatial merge candidates are derived from neighboring prediction units. The procedure for obtaining the spatial merge candidates is the same as the spatial skip candidates. But, when the current prediction unit is 2N×N, N×2N, 2N×nU, 2N×nD, nL×2N or nR×2N and the current prediction unit is a partition 1, the merge candidate corresponding partition 0 is deleted.

The procedure for obtaining the temporal merge candidate is the same as the temporal skip candidate.

A procedure of constructing a merge candidate list and a procedure of generating merge candidate are the same as the procedures in the skip mode.

When there is a merge index in the received prediction unit, the motion vector and the reference picture index of the merge candidate indicated by the merge index in the merge candidate list are determined as the motion vector and the reference index of the current prediction unit. When there is not a merge index in the received prediction unit, the motion vector and the reference picture index of the first available merge candidate are determined as the motion vector and the reference index of the current prediction unit.

If the motion vector and the reference picture index of the current prediction unit are derived, a prediction block is generated using the motion vector in the picture indicated by the reference picture index.

Next, a residual block is restored from a received residual signal through entropy decoding, inverse scan, inverse quantization and inverse transform. The procedures are performed by the entropy decoding unit 210, the inverse scanning unit 221, the inverse quantization unit 222 and the inverse transform unit 223 of the decoding apparatus of FIG. 3, respectively.

Finally, a reconstructed block of the current prediction unit is generated using the prediction block and the residual block.

Next, AMVP mode will be described. When the skip_flag in a coding unit is 0 and the merge_flag in a received prediction unit is 0, AMVP mode is applied. The procedure of generating the prediction block is as follows.

First, a reference picture index and a motion vector difference of a current prediction unit are obtained from the received bit stream. If slice type is B, inter prediction information (inter_pred_flag) is checked. If the inter prediction information indicates a uni-directional prediction using combined reference picture list (Pred_LC), a reference picture among the reference pictures of the combined reference picture list (list_c) is selected using the reference picture index, and the motion vector difference is restored. If the inter prediction information indicates a uni-directional prediction using a reference picture list 0, a reference picture is selected using the reference picture index of the reference picture list 0, and the motion vector difference is restored. If the inter prediction information indicates an bi-directional prediction, each reference picture is selected using each reference picture index of the reference picture lists 0 and 1, and each motion vector difference for each reference picture is restored.

Next, a motion vector prediction is determined. The motion vector predictor is selected among the spatial motion vector candidates and the temporal motion vector candidate.

Figure 6:
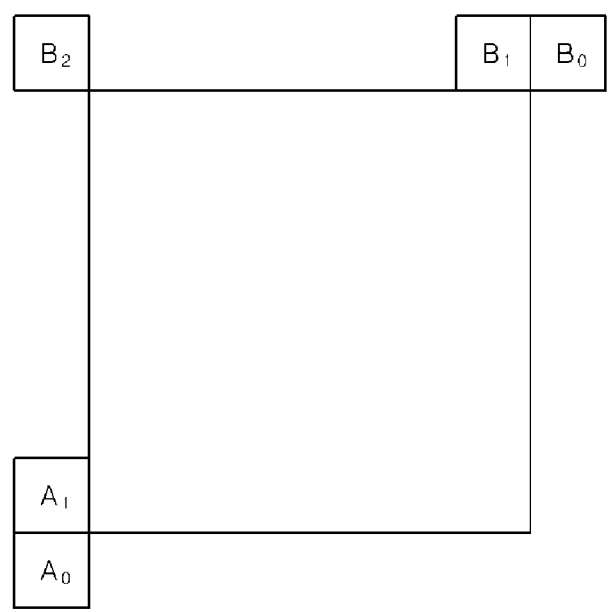
FIG. 6 is a conceptual diagram showing positions of neighboring prediction units used to generate motion vector candidates according to the present invention.

FIG. 6 is a conceptual diagram showing positions of neighboring prediction units used to generate motion vector candidates according to the present invention.

A spatial left motion vector candidate may be one of left prediction units (one of blocks $A_0$ and $A_1$) of a current prediction unit. A spatial above motion vector candidate may be one of above prediction units (blocks $B_0$, $B_1$ and $B_2$) of the current prediction unit.

First, a procedure for deriving the spatial left motion vector candidate will be described.

It is checked whether there is a prediction unit satisfying first conditions or second conditions by retrieving the left blocks of the current prediction unit in the order of blocks $A_0$ and $A_1$. The first conditions are 1) there exists a prediction unit, 2) the prediction unit is an inter prediction coded unit, 3) the prediction unit has same reference picture as that of the current prediction unit and 4) the prediction unit has same reference picture list as that of the current prediction unit. If there is a prediction unit satisfying the first conditions, the motion vector of the prediction unit is determined as the spatial left motion vector candidate. The second conditions are 1) there exists a prediction unit, 2) the prediction unit is an inter prediction coded unit, 3) the prediction unit has same reference picture as that of the current prediction unit and 4) the prediction unit has different reference picture list from that of the current prediction unit. If there is a prediction unit satisfying the second conditions, the motion vector of the prediction unit is determined as the spatial left motion vector candidate. If there is a prediction unit satisfying the first conditions or the second conditions, the motion vector of the prediction unit is determined as the spatial left motion vector candidate.

If there does not exist a prediction unit satisfying any one of the first conditions and the second conditions, it is checked whether there is a prediction unit satisfying third conditions or fourth conditions when retrieving the left blocks in the order of blocks $A_0$ and $A_1$. The third conditions are 1) there exists a prediction unit, 2) the prediction unit is an inter prediction coded unit, 3) the prediction unit has same reference picture list as that of the current prediction unit and 4) the prediction unit has different reference picture from that of the current prediction unit. If there is a prediction unit satisfying the third conditions, the motion vector of the prediction unit is determined as the spatial left motion vector candidate. The fourth conditions are 1) there exists a prediction unit, 2) the prediction unit is an inter prediction coded unit, 3) the prediction unit has different reference picture list from that of the current prediction unit and 4) the prediction unit has different reference picture from that of the current prediction unit. If there is a prediction unit satisfying the third conditions or the forth conditions, the motion vector of the prediction unit is determined as the spatial left motion vector candidate.

The motion vector of the prediction unit satisfying the first conditions or the second conditions is not scaled. But, the motion vector of the prediction unit satisfying the third conditions or the forth conditions is scaled.

If there is not a prediction unit satisfying any one conditions, the spatial left motion vector candidate is unavailable.

A procedure for deriving a spatial above motion vector candidate is as follows.

It is checked whether there is a prediction unit satisfying the first conditions or the second conditions when retrieving the above blocks in the order of blocks $B_0$, $B_1$ and $B_2$. If there is a prediction unit satisfying the first conditions or the second conditions, the motion vector of the prediction unit is determined as the spatial above motion vector candidate.

If there does not exist a prediction unit satisfying any one of the first conditions and the second conditions, it is checked whether there is a prediction unit satisfying third conditions or fourth conditions. If there is a prediction unit satisfying the third conditions or the forth conditions, the motion vector of the prediction unit is determined as the spatial left motion vector candidate. But, If the spatial left motion vector candidate is satisfying the third conditions or the forth conditions, the spatial above motion vector candidate may be set to be unavailable.

The procedure of deriving a temporal motion vector candidate is the same as that of the motion vector of the temporal skip candidate.

Next, a motion vector candidate list is constructed.

The motion vector candidate list is constructed using available spatial and temporal motion vector candidates. The motion vector candidate list may be constructed in a predetermined order. The predetermined order is the order of a spatial left motion vector candidate (block A), a spatial above motion vector candidate (block B) and a temporal motion vector candidate, or the order of a temporal motion vector candidate, a spatial left motion vector candidate (block A) and a spatial above motion vector candidate (block B).

The predetermined order may be changed according to a prediction mode of the prediction unit.

Next, if a plurality of candidates have same motion vector, the candidate having lower priority is deleted in the motion vector candidate list. If the number of motion vector candidates in the list is smaller than a predetermined number, a zero vector is added.

Next, a motion vector predictor of the current prediction unit is obtained. The motion vector candidate indicated by the motion vector index is determined as the motion vector predictor of the current prediction unit.

Next, a motion vector of the current prediction unit is generated by adding the motion vector difference received from an encoder and the motion vector predictor. And a prediction block is generated using the reference picture index received from the encoder and the restored motion vector Also, a residual block is restored from a residual signal received from the encoder through entropy decoding, inverse scan, inverse quantization and inverse transform. The procedures are performed by the entropy decoding unit 210, the inverse scanning unit 221, the inverse quantization unit 222 and the inverse transform unit 223 of the decoding apparatus of FIG. 3, respectively.

Finally, a reconstructed block is generated using the prediction block and the residual block While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An apparatus for encoding a moving picture, the apparatus comprising:
a picture divider configured to determine a size and a prediction mode of each coding block;
an inter predictor configured to determine a reference picture and a motion vector of a current block by performing motion estimation and extract a prediction block corresponding to the current block from the reference picture based on the motion vector when the current block is coded in inter prediction mode;
an intra predictor configured to determine an intra prediction mode of a current block and generate the prediction block corresponding to the current block according to the intra prediction mode when the current block is coded in intra prediction mode;
a transformer configured to transform a residual block obtained by calculating difference between the current block and the prediction block to generate a transform block;
a quantizer configured to determine a quantization step size and quantize the transform block using the quantization step size to generate a quantized transform block;
a scanner configured to scan quantized transform coefficients of the quantized transform block to generate one-dimensional (1D) quantized transform coefficients; and
an entropy coder configured to entropy-code the 1D quantized transform coefficients,
wherein the inter predictor determines an available motion vector out of motion vectors of neighboring blocks adjacent to the current block as a spatial motion vector candidate, determines an available motion vector of a block located at a position corresponding to the current block in a temporal motion vector candidate picture as a temporal motion vector candidate, determines a motion vector predictor of the current block out of the spatial motion vector candidate and the temporal motion vector candidate, and encodes a difference between the motion vector of the current block and the motion vector predictor of the current block,
wherein the temporal motion vector candidate is a motion vector of a first available block out of two blocks which exist in the temporal motion vector candidate picture,
wherein the two blocks are a first candidate block and a second candidate block, the first candidate block is a below right corner block neighbored to a corresponding block which is co-located with the current block in the temporal motion vector candidate picture or a below right block within the corresponding block, and the second candidate block is a first center block which includes an upper left neighboring pixel with respect to a center position of the corresponding block or a second center block which includes a below right neighboring pixel with respect to the center position of the corresponding block,
wherein, when a size of the transform block is larger than 4×4, the quantized transform coefficients of the quantized transform block are divided into a plurality of sub-blocks,
wherein, when the current block is coded in intra prediction, the plurality of sub-blocks are scanned according to a first scan pattern determined by the intra prediction mode of the current block and the quantized transform coefficients of each sub-block are scanned according to a second scan pattern determined by the intra prediction mode of the current block, and wherein the first scan pattern for scanning the plurality of sub-blocks is the same as the second scan pattern for scanning the quantized transform coefficients of each sub-block,
wherein, when the current block is coded in inter prediction, the plurality of sub-blocks and the quantized transform coefficients of each sub-block are scanned using a predetermined scan pattern, wherein, when the prediction block is encoded in merge mode, the inter predictor determines an available motion vector out of motion vectors of neighboring blocks adjacent to the current block as a spatial merge candidate, determines an available motion vector of a block located at a position corresponding to the current block in a temporal merge candidate picture as a temporal merge candidate, determines a motion vector predictor of the current block out of the spatial merge candidate and the temporal merge candidate, and encodes a difference between the motion vector of the current block and the motion vector predictor of the current block, and wherein the temporal merge candidate includes a reference picture index and a motion vector, and the reference picture index of the temporal merge candidate is set to 0.

2. The apparatus of claim 1, wherein the scanner scans the quantized transform coefficients and the plurality of sub-blocks in a reverse direction.

\* \* \* \* \*